United States Patent [19]

Hiramatsu et al.

[11] Patent Number: 5,180,573

[45] Date of Patent: * Jan. 19, 1993

[54] METHOD FOR PRODUCING HYDROGEN PEROXIDE

[75] Inventors: Yasushi Hiramatsu, Tokyo; Yukio Ishiuchi, Ushiku; Hiromitsu Nagashima, Matsudo, all of Japan

[73] Assignee: Mitsubishi Gas Chemical Company, Inc., Tokyo, Japan

[ * ] Notice: The portion of the term of this patent subsequent to Jul. 21, 2009 has been disclaimed.

[21] Appl. No.: 811,035

[22] Filed: Dec. 20, 1991

[30] Foreign Application Priority Data

Feb. 8, 1991 [JP] Japan ................... 3-039209

[51] Int. Cl.$^5$ .............................................. C01B 15/01
[52] U.S. Cl. ..................................................... 423/584
[58] Field of Search ......................................... 423/584

[56] References Cited

U.S. PATENT DOCUMENTS 4,772,458 9/1988 Gosser et al. .................. 423/584
5,082,647 1/1992 Chuang ........................... 423/584

FOREIGN PATENT DOCUMENTS 55-18646 5/1980 Japan .
56-47121 11/1981 Japan .
63-156005 6/1988 Japan .
1-23401 5/1989 Japan .
2-258610 10/1990 Japan .

Primary Examiner—Wayne Langel
Attorney, Agent, or Firm—Wenderoth, Lind & Ponack

[57] ABSTRACT

This invention provides a method for high efficiency, high concentration production of hydrogen peroxide wherein oxygen and hydrogen are reacted in the reaction medium in the presence of a catalyst comprising a metallic or carrier supported platinum group metal catalyst onto which an organic halogen compound which is insoluble in water, which compound excludes compounds which contain no halogen other than fluorine, has been adsorbed or a platinum group metal catalyst supported on a carrier in which a halogenated organic compound, which compound excludes compounds that contain no halogen other than fluorine, has been adsorbed to the carrier prior to supporting the platinum group metal. Since it is not necessary for halogen ions to be present in the reaction medium as it was in the prior art, the problems of deterioration due to the dissolution of the catalyst and of corrosion of the structural materials of the reaction vessel are alleviated.

13 Claims, No Drawings

METHOD FOR PRODUCING HYDROGEN PEROXIDE

FIELD OF UTILIZATION IN INDUSTRY

The present invention relates to an improved method for reacting oxygen and hydrogen in the reaction medium in the presence of a catalyst and producing hydrogen peroxide. More particularly, it is a method for producing hydrogen peroxide wherein oxygen and hydrogen are directly reacted in the reaction medium in the presence of a catalyst comprising a metallic or carrier supported platinum group metal catalyst onto which an organic halogen compound which is insoluble in water, which compound excludes compounds which contain no halogen other than fluorine, has been adsorbed or a platinum group metal catalyst supported on a carrier in which a halogenated organic compound, except for the aforementioned fluorine compounds, has been adsorbed to the carrier prior to supporting the platinum group metal.

DESCRIPTION OF THE PRIOR ART

The main method presently used by industry for producing hydrogen peroxide is the autooxidation method using alkyl-anthraquinone as the reaction medium. The fact that the processes of reduction, oxidation, extraction, purification, and concentration are very complex and that equipment and operations costs are large are given as problem points of this method. Additionally, there are loss due to degeneration of alkyl-anthraquinone and problems of the degeneration of the hydrogenation catalyst.

Several production methods other than the above method have been attempted in order to remedy these problems. One of these is a method for producing hydrogen peroxide directly from oxygen and hydrogen in the reaction medium in the presence of a catalyst. Already, methods for producing hydrogen peroxide from hydrogen and oxygen and using platinum group metals as catalysts have been proposed, and the production of moderate concentrations of hydrogen peroxide has been described (Please refer to Japanese Patent Publication No. 47121/1981, Japanese Patent Publication No. 18646/1980, Japanese Patent Publication No. 23401/1989, Japanese Laid Open Patent Application No. 156005/1988 and Japanese Laid Open Patent Application No. 258610/1990). All of these use aqueous solutions containing acid and/or inorganic salts as the reaction medium, and, in particular, due to the presence of halogen ions in the reaction medium, catalytic activity is inhibited, the decomposition of the produced hydrogen peroxide is suppressed, and a high concentration of hydrogen peroxide is obtained. For example, it has been shown in Japanese Laid Open Patent Application No. 156005/1988 that the selective production of a high concentration of hydrogen peroxide due to the presence of a halogen ion such as bromine ion in the reaction medium in a method for using a platinum group catalyst to produce a high concentration of hydrogen peroxide from hydrogen and oxygen under elevated pressure in an acidic aqueous solution is possible. Additionally, we have applied for a patent for a method of producing hydrogen peroxide by direct reaction of oxygen and hydrogen in the presence of a platinum group metal catalyst carried on a halogenated resin in a reaction medium which does not contain halogen ion (U.S. Ser. No. 07/763,166).

PROBLEMS THE PRESENT INVENTION AIMS TO SOLVE

Practically speaking, in prior art methods for the production of hydrogen peroxide by the catalytic reaction of hydrogen and oxygen in the reaction medium in the aforementioned manner, it is necessary for there to be a high concentration of acid and halogen ion present in the reaction medium in order to obtain a high concentration of hydrogen peroxide. In that case, there is a problem with the dissolution of the catalyst metal and the reaction vessel structural materials into the reaction medium before, during and after the reaction. Particularly, in a case such as that described above where there are halogen ions present, the amount of dissolution increases in proportion to the concentration of halogen ion. This is a very serious problem for the catalyst life when it is subjected to continuous long term use. Additionally, the selection of reaction vessel structural materials is also thereby limited, and, at the same time, such materials are necessarily very expensive.

Moreover, since there are also halogen ions present in the hydrogen peroxide obtained after the reaction, depending upon the intended use of the hydrogen peroxide, there exists a substantial economic problem resulting from the necessity of such post production operations as a removal of halogen ions.

MEANS FOR SOLVING THE PROBLEMS

In regard to their method of producing hydrogen peroxide by the direct reaction of oxygen and hydrogen in the reaction medium, either in the presence or absence of an inert gas such as nitrogen that would not serve as an impediment to the reaction, the inventors of the present invention, as a result of continuing investigations into a production method to obtain high concentrations of hydrogen peroxide in a reaction medium which does not contain halogen ions, have discovered that it is possible to achieve this goal through the use of a catalyst comprising a metallic or carrier supported platinum group metal catalyst onto which an organic halogen compound which is insoluble in water, which compound excludes compounds which contain no halogen other than fluorine, has been adsorbed or a platinum group metal catalyst supported on a carrier in which a halogenated organic compound, which compound excludes compounds which contain no halogen other than fluorine, has been adsorbed to the carrier prior to supporting the platinum group metal.

That is to say, the primary objective of the present invention is to offer a method of producing hydrogen peroxide where it is possible to obtain a high concentration of hydrogen peroxide by reacting oxygen and hydrogen in the presence of a catalyst using a neutral or acidic solution which does not contain halogen ions as the reaction medium. As such post production procedures as the removal of halogen ions from the hydrogen peroxide produced have become unnecessary, the second objective of the present invention is to offer a method for the production of hydrogen peroxide in which the purification process has been simplified. The third objective is to offer a method of producing hydrogen peroxide directly from oxygen and hydrogen in which commercial operation of large scale, very highly practical, economically advantageous production is facilitated.

As the platinum group metal used in the present invention, concretely, ruthenium, osmium, rhodium, iridium, palladium, and platinum may be used either singly or in alloys or mixtures of two or more. Preferably, palladium or platinum may be used.

The organic halogen compound which is insoluble in water in the present invention is an organic halogen compound which will not spontaneously mix with neutral or acidic water. With regard to the chemical structure of the organic halogen compound of this invention, outside of the presence of the halogen, there are no limitations with regard to such varieties as aromatic compounds, aliphatic compounds or functional groups However, since halogen compounds containing no halogen other than fluorine have very low selectivities in the present invention, they have been excluded from the scope of the present invention. As the organic halogen compound which is insoluble in water in the present invention, such compounds as halogen containing polymers, halogenated benzene or benzene derivatives, halogenated aliphatic carboxylic acids and halogenated organosilicon compounds may be employed. The halogenated organosilicon compounds referred to here are organosilicon compounds containing a halogen atom not directly bonded to a silicon atom.

Concrete examples of organic halogenated compounds which are insoluble in water which may be employed include, for example, such compounds as bromobenzene, trichlorobenzene, chlorostyrene polymer, 2-bromo-n-caproic acid, chloromethyldimethylchlorosilane, bis(chloromethyl)tetramethyldisilazane, chloromethyldimethylvinylsilane, dichloromethyldimethylchlorosilane, chloroethyltrichlorosilane, dichloroethyltrichlorosilane, chloropropyltrimethoxysilane, chlorophenyltrimethoxysilane, bromomethyldimethylchlorosilane, dibromoethyltrichlorosilane, bromopropyltriethoxysilane, bromophenyldimethylvinylsilane, and dibromovinyltrimethylsilane. From among these, trichlorobenzene, bromobenzene, 2-bromo-n-caproic acid, chloromethyldimethylchlorosilane, dichloromethyldimethylchlorosilane, bromomethyldimethylchlorosilane and dibromoethyltrichlorosilane may be employed as particularly preferable. The form of the catalyst used in the present invention may be selected freely from among such forms as fine powder, grains, or pellets.

Moreover, it is possible to use a catalyst supported on a carrier in the present invention, and, in the case where a catalyst carrier is used, it is possible to use ordinary organic resins and such prior art inorganic carriers as silica, alumina, and activated carbon. The basic characteristics of the carrier of the present invention are not limited. However, as normal characteristics of the carrier, a large surface area and the ability to effectively support the catalyst metal in a highly dispersed fashion are preferable. In addition, in cases where organic halogen compounds which do not contain reactive functional groups are used, the employment of an adsorbing resin as the carrier is particularly desirable. Adsorbing resins are insoluble crosslinked resins which have micropores, which have large specific surface areas, which adsorb various organic substances through Van der Waals forces and among which are included such polymers and copolymers as styrene-divinylbenzene copolymers and polymers and copolymers of acrylate esters, methacrylate esters, and vinylpyridine, etcetera.
. . .

The amount of catalyst metal supported on the above carrier in the present invention is normally about 0.1% to 10% of the weight of the carrier. Prior art methods may be used for the method of supporting the catalyst metal.

The method of producing the catalyst of the present invention is not restricted. However, the simplest method for producing the catalyst of the present invention is to immerse a catalyst supported on a carrier or a metal powder catalyst into an organic solvent in which the organic halogen compound has been dissolved. After the solvent has been removed and the catalyst has been dried, it is ready for use. In the event that the dissolution of very small amounts of the organic compound when the catalyst is used over long periods of time becomes a problem, such methods as the use of an adsorbing resin as the carrier as described above, or methods of fixing the organic halogen compound to the catalyst surface, that is to say, such methods as adsorbing bromostyrene or chlorostyrene on the catalyst surface and then polymerizing them there by means of light or heat may be used. Additionally, the following methods are included among the methods of the present invention for preparing the catalyst. Specifically, methods of fixing halogenated organosilicon compounds containing reactive functional groups to the surface of the carrier by reacting them with such functional groups as hydroxyl groups contained in the carrier itself may be used.

The amount of the organic halogen compound adsorbed in the present invention differs according to the amount of catalyst metal, the effective surface area of the metal and the type of the organic halogen compound. Accordingly, the amount supported must be optimized for each catalyst. As a normal supported amount, a range of about 0.01% to 50% for the percentage of the weight of the included halogen to the weight of the catalyst should be appropriate.

With regard to the amount of the catalyst to be used in the production of hydrogen peroxide from oxygen and hydrogen in the present invention, there are no particular limitations. However, normally, more than one gram of catalyst per liter of reaction medium are used. In addition, it is possible to perform the reaction in slurry form by adding large amounts of the catalyst to the reaction medium.

It is possible to use water as the reaction medium in the present invention. However, it is also possible to add substances which are shown to be usable as stabilizers with respect to hydrogen peroxide. For example, such prior art hydrogen peroxide stabilizers as inorganic acids, organic acids, amino acids, organic salts, chelating agents, and surface active agents may be used. The amount of stabilizer used differs according to the type of the stabilizer, its effect and the concentration of hydrogen peroxide required. The normal amount of stabilizer added is less than 0.1% by weight of the reaction medium and 100 ppm. or less is preferable.

As concrete examples of stabilizers, other than such inorganic acids as phosphoric acid and nitric acid, such phosphoric acid salts as sodium pyrophosphate and such organic acids as aminotri(methylenephosphonic acid) may be employed. However, as particularly preferred stabilizers, aminotri(methylenephosphonic acid), 1-hydroxyethyledene-1,1-diphosphonic acid, ethylenediaminetetra(methylenephosphonic acid), the sodium salts of all of the preceding, or sodium pyrophosphate may be employed.

The hydrogen peroxide production reaction of the present invention may be carried out either continuously or by batch, and, moreover, the reaction vessel used may be either a fixed bed type or an agitator type. In addition, the hydrogen peroxide production of the present invention may be carried out by bringing oxygen and hydrogen together with a catalyst in the reaction medium either in the presence or absence of an inert gas such as nitrogen which will not impede the progress of the reaction and under normal reaction conditions including a reaction pressure of 3 kg./cm$^2$.G–150 kg./cm$^2$.G, a reaction temperature of between 0° C. and 50° C. and a reaction time of 30 minutes to 6 hours.

EXAMPLES

Following is a further more concrete explanation of this invention made by means of Examples and Comparative Experiments. The analytical values of gas composition used in the Examples are values taken by gas chromatography. Moreover, the measurement of the concentration of hydrogen peroxide produced in the reaction mixture was performed by titration with sulphuric acid-potassium permanganate.

Example 1

Mitsubishi Kasei's aromatic adsorbing resin ("HP20": the trade name for a product of Mitsubishi Kasei Corporation, a styrene-divinylbenzene copolymer (standard product), grain size: 0.2 mm.–1 mm. diameter, specific surface area: 605 m$^2$/g., true specific gravity: 1.01, water content: about 56.3% by weight) was washed first with 30% by weight hydrogen peroxide and then with water after which it was dried. After swelling the resin with chloroform, it was impregnated with a palladium acetate/chloroform solution and then again dried. The palladium acetate impregnated into the HP20 resin was then reduced by hydrogen gas at 100° C. and washed with methanol and, after washing with methanol, was washed with water, and a 1% by weight palladium catalyst supported on HP20 was obtained.

Again, the catalyst was dried and was impregnated with a trichlorobenzene/methanol solution in which the amount of trichlorobenzene was equal to 10% of the weight of the dried catalyst. After impregnating the catalyst with the solution, the solution was diluted by twice its volume of water. Subsequently, using an evaporator, the methanol was removed selectively, the catalyst was separated from the water by filtration, washed with water, and an HP20 supported 1% by weight palladium catalyst (water content: about 50% by weight) onto which trichlorobenzene was adsorbed in an amount equal to 10% of the weight of the catalyst was obtained.

One hundred milliliters of an aqueous solution containing 12 ppm. phosphoric acid and 12 ppm. sodium pyrophosphate were placed in a 180 ml. volume glass vessel. Six grams of the above catalyst were added to this solution, and the glass vessel was then placed in a autoclave with a 300 ml. capacity. After exchanging the air in the autoclave with a gaseous mixture consisting by volume of 4% hydrogen gas, 16% oxygen gas and 80% nitrogen gas, this same gaseous mixture was added to the autoclave until a pressure of 25 kg./cm$^2$.G was achieved and maintained. A temperature of 10° C. and stirring at a rate of 1000 rpm. were maintained for 1 hour while introducing a flow of the same gaseous mixture at a rate of 0.8 l./min. through the autoclave. After stirring for one hour, the concentration of hydrogen peroxide produced in the reaction mixture was 0.45% by weight of the reaction mixture, and the hydrogen selectivity was 55%.

Hydrogen selectivity = |(the amount of hydrogen peroxide produced in the reaction in moles)/(the amount of all hydrogen consumed calculated from the change in gas composition in moles)| × 100.

In addition, after the reaction mixture containing the hydrogen peroxide was allowed to stand under atmosphere for 30 minutes after the termination of the reaction, the catalyst was separated from the reaction mixture by filtration. The results of measuring the amount of palladium dissolved into the reaction mixture by inductively coupled plasma emission spectroscopy using an SPS 1200 VR type spectrometer made by Seiko Instruments Inc. were that palladium concentration was less than 1 ppm.

Moreover, the results of measurement of the amount of chlorine dissolved into the same reaction mixture using Mitsubishi Kasei Corporation's TSX-10 chlorine.-sulfur analysis instrument were that chlorine concentration was less than 1 ppm. It was observed that the amount of dissolution of palladium and halogen compounds from the catalyst into the reaction mixture was extremely small.

Comparative Experiment 1 (Comparison with Example 1)

Using Mitsubishi Kasei's HP20 aromatic adsorbing resin as the carrier, an HP20 supported 1% by weight palladium catalyst (water content: about 50% by weight) onto which was adsorbed trimethylbenzene in an amount equal to 10% of the weight of the catalyst was obtained by the same methods as in Example 1. Upon reacting oxygen and hydrogen using this catalyst under the same reaction conditions as in Example 1, the concentration of hydrogen peroxide produced was 0.02% by weight of the reaction mixture, and the hydrogen selectivity was 1%.

Comparative Experiment 2 (Comparison with Example 1)

Upon reacting oxygen and hydrogen using the same catalyst as in Comparative Experiment 1 and under the same reaction conditions as in Comparative Experiment 1, except that 100 ml. of an aqueous solution containing 0.1 mol./l. of hydrochloric acid was used in place of the aqueous solution of phosphoric acid—sodium pyrophosphate solution as the reaction medium, the concentration of hydrogen peroxide produced was 0.42% by weight of the reaction mixture, and the hydrogen selectivity was 51%. In addition, upon separating the catalyst from the reaction mixture by filtration and measuring the amount of palladium dissolved into the reaction mixture after allowing the reaction mixture to stand for 30 minutes exposed to the atmosphere in the same manner as in Example 1, the concentration of palladium in the reaction mixture was found to be 35 ppm. In order to obtain virtually the same results as were obtained in Example 1 using prior art methods in this way, the presence of high concentrations of acid and halogen ion in the reaction medium is necessary, and, as a result, the amount of dissolution of palladium increases considerably.

Example 2

Upon reacting oxygen and hydrogen using the same catalyst as in Example 1 under the same reaction conditions as in Example 1, except that 100 ml. of pure water were used in place of the aqueous solution of phosphoric acid—sodium pyrophosphate solution as the reaction medium, the concentration of hydrogen peroxide produced was 0.20% by weight of the reaction mixture, and the hydrogen selectivity was 25%.

Comparative Experiment 3 (Comparison with Example 2)

Upon reacting oxygen and hydrogen using the same catalyst as in Comparative Experiment 1 under the same reaction conditions as in Example 1 except that 100 ml. of pure water were used in place of the aqueous solution of phosphoric acid—sodium pyrophosphate as the reaction medium, the concentration of hydrogen peroxide produced was 0.01% by weight of the reaction mixture, and the hydrogen selectivity was less than 1%.

Example 3

After washing Mitsubishi Kasei's HP20 aromatic adsorbing resin with methanol, with 30% by weight hydrogen peroxide and finally with water, it was impregnated with an aqueous solution of chloroplatinic acid and dried under vacuum. The resulting resin was reduced at 120° C. using hydrogen gas and then washed again with methanol and then water to obtain an HP20 supported 0.5% by weight platinum catalyst. Again the catalyst was dried and was impregnated with an iodotoluene/methanol solution in which the amount of iodotoluene was equal to 10% of the weight of the dried catalyst. After impregnating the catalyst with the solution, the solution was diluted by twice its volume of water. Subsequently, the methanol was selectively removed by distillation at 80° C. for 3 hours while adding water equal to the amount of methanol evaporated. Then, the catalyst was separated from the water by filtration, washed with water and an HP20 supported 0.5% by weight platinum catalyst (water content: about 50% by weight) onto which iodotoluene was adsorbed in an amount equal to 10% of the weight of the catalyst was obtained.

One hundred milliliters of an aqueous solution containing 12 ppm. phosphoric acid and 12 ppm. sodium pyrophosphate were placed in a 180 ml. volume glass vessel. Three grams of the above catalyst were added to this solution, and the glass vessel was then placed in an autoclave with a 300 ml. capacity. After exchanging the air in the autoclave with a gaseous mixture consisting by volume of 4% hydrogen gas, 40% oxygen gas and 56% nitrogen gas, this same gaseous mixture was added to the autoclave until a pressure of 25 kg./cm$^2$.G was achieved and maintained. A temperature of 10° C. and stirring at a rate of 1000 rpm. were maintained for 1 hour while introducing a flow of the same gaseous mixture at a rate of 0.8 l./min. through the autoclave. After stirring for one hour, the concentration of hydrogen peroxide produced in the reaction mixture was 0.15% by weight of the reaction mixture, and the hydrogen selectivity was 87%.

Comparative Experiment 4 (Comparison with Example 3)

Using Mitsubishi Kasei's HP20 aromatic adsorbing resin as the carrier, an HP20 supported 0.5% by weight platinum catalyst (water content: about 50% by weight) onto which trimethylbenzene was adsorbed in an amount equal to 10% of the weight of the catalyst was obtained by the same methods as in Example 3. Upon reacting oxygen and hydrogen using this catalyst under the same reaction conditions as in Example 3, the concentration of hydrogen peroxide produced was 0.00% by weight of the reaction mixture, and the hydrogen selectivity was 0%.

Example 4

A commercially available palladium black catalyst was impregnated with a methanol solution of bromobenzene in which the amount of bromobenzene was equal to 15% of the weight of the catalyst. The bromobenzene was adsorbed to the catalyst by evaporating the solvent at 80° C. while agitating the solution-catalyst mixture, and a palladium black catalyst to which bromobenzene was adsorbed in an amount equal to 15% of the weight of the catalyst was obtained.

One hundred grams of an aqueous solution containing 0.1 mol./l. of sulphuric acid were placed in a 180 ml. volume glass vessel to serve as the reaction medium. One gram of the above catalyst was added to this solution, and the glass vessel was then placed in an autoclave with a 300 ml. capacity. After exchanging the air in the autoclave with a gaseous mixture consisting by volume of 4% hydrogen gas, 40% oxygen gas and 56% nitrogen gas, this same gaseous mixture was added to the autoclave until a pressure of 25 kg./cm$^2$.G was achieved and maintained. A temperature of 10° C. and stirring at a rate of 2000 rpm. were maintained for 1 hour while introducing a flow of the same gaseous mixture at a rate of 3.5 l./min. through the autoclave. After stirring for one hour, the concentration of hydrogen peroxide produced in the reaction mixture was 0.85% by weight of the reaction mixture, and the hydrogen selectivity was 25%.

Comparative Experiment 5 (Comparison with Example 4)

Using a commercially available palladium black catalyst, a palladium black catalyst to which trimethylbenzene was adsorbed in an amount equal to 15% of the weight of the catalyst was obtained using the same methods as in Example 4. Upon reacting oxygen and hydrogen using this catalyst under the same reaction conditions as in Example 4, the concentration of hydrogen peroxide produced was 0.00% by weight of the reaction mixture, and the hydrogen selectivity was 0%.

Example 5

A commercially available platinum black catalyst was impregnated with a methanol solution of iodobenzene in which the amount of iodobenzene was equal to 10% of the weight of the catalyst. The iodobenzene was adsorbed onto the catalyst by evaporating the solvent at 80° C. while agitating the solution-catalyst mixture, and a platinum black catalyst to which iodobenzene was adsorbed in an amount equal to 10% of the weight of the catalyst was obtained. Upon reacting oxygen and hydrogen using this catalyst and under the same reaction conditions as in Example 4, the concentration of the hydrogen peroxide produced was 0.58% by weight of the reaction mixture, and the hydrogen selectivity was 18%.

Comparative Experiment 6 (Comparison with Example 5)

Using a commercially available platinum black catalyst, a platinum black catalyst onto which trimethylbenzene was adsorbed in an amount equal to 10% of the weight of the catalyst was obtained using the same methods as in Example 5. Upon reacting oxygen and hydrogen using this catalyst under the same reaction conditions as in Example 4, the concentration of hydrogen peroxide produced was 0.00% by weight of the reaction mixture, and the hydrogen selectivity was 0%.

Example 6

A commercially available alumina supported 1% by weight palladium catalyst was impregnated with an ethanol solution of 2-bromo-n-caproic acid in which the amount of 2-bromo-n-caproic acid was equal to 5% of the weight of the catalyst, and the ethanol solution-catalyst mixture was dried under vacuum at room temperature. Then, the catalyst was treated with hydrogen gas at 100° C., and an alumina supported 1% by weight palladium catalyst onto which 2-bromo-n-caproic acid was adsorbed in an amount equal to 5% of the weight of the catalyst was obtained.

Ten grams of an aqueous solution containing 0.1 mol./l. of sulphuric acid were placed in a 65 ml. volume glass vessel to serve as the reaction medium. 50 mg. of the catalyst treated by the above method were added to this solution, and the glass vessel was then placed in an autoclave with a 100 ml. capacity. After exchanging the air in the autoclave with a gaseous mixture consisting by volume of 4% hydrogen gas, 40% oxygen gas and 56% nitrogen gas, this same gaseous mixture was added to the autoclave until a pressure of 50 kg./cm$^2$.G was achieved and maintained. A temperature of 10° C. was maintained and the reaction mixture was stirred at a rate of 2000 rpm. while the reaction was continued for 1 hour, and the above gas mixture was not supplemented during the reaction. After the reaction, the concentration of hydrogen peroxide produced in the reaction mixture was 0.30% by weight of the reaction mixture, and the hydrogen selectivity was 84%.

Comparative Experiment 7 (Comparison with Example 6)

Using a commercially available alumina supported palladium catalyst, an alumina supported 1% by weight palladium catalyst onto which perfluorodecalin was adsorbed in an amount equal to 5% of the weight of the catalyst was obtained using the same methods as in Example 6. Upon reacting oxygen and hydrogen using this catalyst under the same reaction conditions as in Example 6, the concentration of hydrogen peroxide produced was 0.00% by weight of the reaction mixture, and the hydrogen selectivity was 0%.

Example 7

A commercially available alumina supported 1% by weight palladium catalyst was impregnated with an methylene chloride solution of 4-bromostyrene in which the amount of 4-bromostyrene was equal to 10% of the weight of the catalyst, and the impregnated catalyst was dried at room temperature. Subsequently, the 4-bromostyrene adsorbed onto the catalyst was polymerized under nitrogen gas at 120° C. and then treated with hydrogen gas at 100° C., and an alumina supported 1% by weight palladium catalyst to which polybromostyrene was adsorbed in an amount equal to 10% of the weight of the catalyst was obtained. Upon reacting oxygen and hydrogen using this catalyst under the same reaction conditions as in Example 6, the concentration of hydrogen peroxide produced was 0.20% by weight of the reaction mixture, and the hydrogen selectivity was 20%.

Comparative Experiment 8 (Comparison with Example 7)

Using a commercially available alumina supported 1% by weight palladium catalyst and using styrene in place of the 4-bromostyrene of Example 7, an alumina supported 1% by weight palladium catalyst onto which polystyrene was adsorbed in an amount equal to 10% of the weight of the catalyst was obtained using the same methods as in Example 7. Upon reacting oxygen and hydrogen using this catalyst under the same reaction conditions as in Example 6, the concentration of hydrogen peroxide produced was 0.00% by weight of the reaction mixture, and the hydrogen selectivity was 0%.

Example 8

A commercially available silica supported 5% by weight palladium catalyst was impregnated with a solution composed of a mixture of a benzene solution of metaxylylene diisocyanate (a reagent manufactured by Takeda Chemical Industries, Ltd.) added where the amount of metaxylylene diisocyanate was equal to 8% of the weight of the catalyst and a benzene solution of 4-bromoresorcine (a reagent manufactured by Tokyo Kasei Kogyo Co., Ltd.) where the amount of 4-bromoresorcine is equal to 10% of the weight of the catalyst. After the solution-catalyst mixture was agitated for 30 minutes at room temperature, it was dried under vacuum at room temperature. Subsequently, polymerization was carried out under nitrogen gas at 120° C. Then, the catalyst was treated with hydrogen gas at 100° C., and a silica supported 5% by weight palladium catalyst onto which polybromourethane was adsorbed in an amount equal to 18% of the weight of the catalyst was obtained. Upon reacting oxygen and hydrogen using this catalyst under the same reaction conditions as in Example 4, the concentration of hydrogen peroxide produced was 0.40% by weight of the reaction mixture, and the hydrogen selectivity was 30%.

Comparative Experiment 9 (Compared with Example 8)

Using a commercially available silica supported 5% by weight palladium catalyst and using resorcine in place of the 4-bromoresorcine of Example 8, a silica supported 5% by weight palladium catalyst onto which polyurethane was adsorbed in an amount equal to 18% of the weight of the catalyst was obtained using the same methods as in Example 8. Upon reacting oxygen and hydrogen using this catalyst under the same reaction conditions as in Example 4, the concentration of hydrogen peroxide produced was 0.01% by weight of the reaction mixture, and the hydrogen selectivity was 1%.

Example 9

Using dehydrated toluene as the solvent, a solution of chloromethyldimethylchlorosilane (a reagent manufactured by Tokyo Kasei Kogyo Co., Ltd.) which is an organosilicon compound containing a halogen atom directly bonded to a silicon atom and a halogen atom not directly bonded to a silicon atom, was prepared in which the weight of the chloromethyldimethylchlorosilane was 5% of the weight of the toluene, and this solution was added to a commercially available silica supported 2% palladium catalyst. This solution-catalyst mixture was allowed to stand for 24 hours at room temperature to permit the reaction between the hydroxyl groups on the catalyst carrier and the reactive chlorines bonded directly to silicon atoms. After driving the reaction to completion by heating the mixture for two hours at 70° C., the catalyst was separated from the solution by filtration and dried at 120° C. Then, in order to remove the hydrochloric acid produced by the reaction, the catalyst was washed with methanol and then water, and silver nitrate solution was added to the washing water so that, until chlorine ion was no longer detected, washing with water was continued. Finally, the catalyst was washed with methanol and after air drying, was treated with hydrogen gas at 130° C., and a silica supported 2% by weight catalyst which had been treated by the addition of chloromethylsilane was obtained. Upon reacting oxygen and hydrogen using this catalyst under the same reaction conditions as in Example 4, the concentration of hydrogen peroxide produced was 0.85% by weight of the reaction mixture, and the hydrogen selectivity was 45%.

Comparative Experiment 10 (Comparison with Example 9)

A commercially available silica supported 2% by weight palladium catalyst was treated by addition of trimethylsilane using the same methods as in Example 9 except that trimethylchlorosilane (a reagent manufactured by Tokyo Kasei Kogyo Co., Ltd.) which is an organosilicon compound where the only halogen atoms are reactive chlorine atoms bonded directly to a silicon atom was used in place of the chloromethyldimethylchlorosilane of Example 9. That is to say, a silica supported 2% by weight palladium catalyst which did not contain chlorine atoms was obtained. Upon reacting oxygen and hydrogen using this catalyst under the same reaction conditions as in Example 4, the concentration of hydrogen peroxide produced was 0.05% by weight of the reaction mixture, and the hydrogen selectivity was 5%.

Example 10

Using dehydrated toluene as the solvent, a bromomethyldimethylchlorosilane (a reagent manufactured by Tokyo Kasei Kogyo Co., Ltd.) solution was prepared so that the weight of bromomethyldimethylchlorosilane was 5% of the weight of the toluene. A commercially available silica supported 1% palladium catalyst which was dried for 24 hours at 200° C. and impregnated with dehydrated toluene. Then, the 5% by weight bromomethyldimethylchlorosilane solution was added to the catalyst in such an amount that the weight of bromine added was equal to 0.05% of the weight of the catalyst, and this solution-catalyst mixture was allowed to stand for 24 hours at room temperature. After driving the reaction to completion by heating the mixture for two hours at 70° C., the catalyst was separated from the solution by filtration and dried at 120° C. Then, in order to remove the hydrochloric acid produced by the reaction, the catalyst was washed with methanol and then water, and silver nitrate solution was added to the washing water and, until chloride ion was no longer detected, washing with water was continued. Finally, the catalyst was washed with methanol and after air drying, was treated with hydrogen gas at 130° C., and a silica supported 1% palladium catalyst was obtained which had been treated by the addition of bromomethylsilane in such amount that the amount of bromine added was equal to 0.05% of the weight of the catalyst.

Eighty grams of an aqueous solution containing 0.1 mol./l. of sulphuric acid were placed in a 180 ml. volume glass vessel to serve as the reaction medium. Four tenths of a gram of the above catalyst were added to this solution, and the glass vessel was then placed in an autoclave with a 300 ml. capacity. After exchanging the air in the autoclave with a gaseous mixture consisting by volume of 4% hydrogen gas, 40% oxygen gas and 56% nitrogen gas, this same gaseous mixture was added to the autoclave until a pressure of 50 kg./cm$^2$.G was achieved and maintained. A temperature of 10° C. and stirring at a rate of 2000 rpm. were maintained for 1 hour while introducing a flow of the same gaseous mixture at a rate of 1.0 l./min. through the autoclave. After stirring for one hour, the concentration of hydrogen peroxide in the reaction mixture was 1.32% by weight of the reaction mixture, and the hydrogen selectivity was 74%.

Comparative Experiment 11 (Comparison with Example 10)

Using a commercially available silica supported 1% by weight palladium catalyst, a silica supported 1% by weight palladium catalyst was obtained which was treated by addition of trimethylsilane in such amount that the amount of silicon added was 1% of the weight of the catalyst using the same methods as in Example 10, except that trimethylchlorosilane (a reagent manufactured by Tokyo Kasei Kogyo Co., Ltd.) was used in place of the bromomethyldimethylchlorosilane of Example 10 and that the amount of trimethylchlorosilane was adjusted to provide the result of an added silicon weight of 1% of the weight of the catalyst. Upon reacting oxygen and hydrogen using this catalyst under the same reaction conditions as in Example 10, the concentration of hydrogen peroxide produced was 0.03% by weight of the reaction mixture, and the hydrogen selectivity was 4%.

Example 11

The catalyst was prepared by treating silica powder by the addition of bromomethyldimethylsilane before it is used to support palladium. That is to say, a dehydrated toluene solution of bromomethyldimethylchlorosilane where the amount of bromomethyldimethylchlorosilane is equal to 5% of the weight of the solution as in Example 10 was added in such amount that the weight of bromine added is equal to 0.05% of the weight of the silica powder to the silica powder which before addition of the solution had been impregnated with dehydrated toluene after being dried at 200° C. for 24 hours. This mixture was left to stand for 24 hours, and, then, after driving the reaction to completion by heating it at 70° C. for 2 hours, the treated silica powder was separated by filtration and dried at 120° C. The treated silica powder was washed with methanol and then washed with water, and silver nitrate solution was added to the water so that, until chloride ion was no longer detected, washing was continued. Finally, the silica powder was washed with methanol, air dried, and dried under nitrogen at 120° C., and a silica powder treated by the addition of bromomethyldimethylsilane in which the amount of bromine added was equal to 0.05% of the weight of the silica powder was obtained.

The treated silica powder obtained in this manner was impregnated with a palladium acetate/chloroform solution in which the amount of palladium was equal to 1% of the weight of the treated silica powder. The impregnated treated silica powder was dried under vacuum and reduced at 100° C. using hydrogen gas, and a 1% by weight palladium catalyst in which the palladium was supported on silica powder which had been treated by the addition of bromomethyldimethylsilane in such an amount that the weight of bromine added was equal to 0.05% of the weight of the catalyst carrier was obtained. Upon reacting oxygen and hydrogen using this catalyst and under the same reaction conditions as in Example 10, the concentration of hydrogen peroxide produced was 1.02% by weight of the reaction mixture, and the hydrogen selectivity was 70%.

Examples 12, 13, and 14

Using commercially available alumina supported 5% by weight palladium catalyst, titania supported 5% by weight palladium catalyst, and silica-magnesia supported 5% by weight palladium catalyst, and treating each of them by addition of bromomethyldimethylsilane in such amount that the weight of bromine added was 1% of the weight of the respective catalyst using the same methods as in Example 10, three palladium catalysts which were 5% palladium by weight were obtained. Eighty grams of an aqueous solution containing 0.1 mol./l. of sulphuric acid were placed in each of three 180 ml. volume glass vessels to serve as the reaction medium. Eighty milligrams of the each of the above catalysts were added to the solutions, one type of catalyst per solution, and the glass vessels were then placed in autoclaves with 300 ml. capacities. After exchanging the air in the autoclaves with a gaseous mixture consisting by volume of 3.5% hydrogen gas, 20.5% oxygen gas and 76% nitrogen gas, this same gaseous mixture was added to the autoclaves until a pressure of 10 kg./cm$^2$.G was achieved and maintained. A temperature of 10° C. and stirring at a rate of 2000 rpm. were maintained for 1 hour while introducing a flow of the same gaseous mixture at a rate of 0.7 l./min. through the autoclaves. After stirring for one hour, the following results were obtained:

| Catalyst | H$_2$O$_2$ Conc. (wt %) | H$_2$ Selectivity (%) |
| --- | --- | --- |
| Ex. 12 5% Pd/Al$_2$O$_3$ | 0.43 | 83 |
| Ex. 13 5% Pd/TiO$_2$ | 0.74 | 75 |
| Ex. 14 5% Pd/SiO$_2$—MgO | 0.55 | 76 |

Comparative Experiments 12, 13, and 14 (Comparison with Examples 12, 13 and 14)

Using commercially available alumina supported 5% by weight palladium catalyst, titania supported 5% by weight palladium catalyst, and silica-magnesia supported 5% by weight palladium catalyst, and treating each of them by addition of trimethylsilane in such amount that the weight of silicon added was 2.0% of the weight of the respective catalyst using the same methods as in Example 11, three palladium catalysts which were 5% palladium by weight were obtained. Upon reacting oxygen and hydrogen using these catalysts under the same reaction conditions as in Example 10, the following results were obtained:

| Catalyst | H$_2$O$_2$ Conc. (wt %) | H$_2$ Sel. (%) |
| --- | --- | --- |
| Comp. Ex. 12 5% Pd/Al$_2$O$_3$ | 0.01 | 1 |
| Comp. Ex. 13 5% Pd/TiO$_2$ | 0.00 | 0 |
| Comp. Ex. 14 5% Pd/SiO$_2$—MgO | 0.00 | 0 |

Example 15

Upon reacting oxygen and hydrogen under the same reaction conditions as in Example 12 except that pure water was used as the reaction medium, and using a titania supported 5% by weight palladium catalyst which was treated by addition of bromomethyldimethylsilane using the same methods as in Example 13, the concentration of hydrogen peroxide produced was 0.30% by weight of the reaction mixture, and the hydrogen selectivity was 20%.

Comparative Experiment 15 (Comparison with Example 15)

Upon reacting oxygen and hydrogen under the same reaction conditions as in Example 12, except that pure water was used as the reaction medium, and using a titania supported 5% by weight palladium catalyst which was treated by addition of trimethylsilane using the same methods as in Comparative Experiment 13, the concentration of hydrogen peroxide produced was 0.00% by weight of the reaction mixture, and the hydrogen selectivity was 0%.

Examples 16–21

Using a commercially available silica supported 1% by weight palladium catalyst, and treating six separate portions of it with the respective addition of 1,3-bis(-chloromethyl)tetramethyldisilazane (BCMTMDS) (a reagent manufactured by Tokyo Kasei Kogyo Co., Ltd.), 1,2-dibromoethyltrichlorosilane (DBETCS), dichloromethyldimethylchlorosilane (DCMDMCS), 3-chloropropyltrimethoxysilane (CPRTMS), 4-chlorophenyltrimethoxysilane (CPHTMS), and 3-bromopropyltriethoxysilane (BPRTES) (the preceding 5 reagents were manufactured by Shin Etsu Chemical Co., Ltd.), one of the above compounds per each portion of catalyst, in place of the bromomethyldimethylchlorosilane of Example 10 in amounts necessary to produce respective halogen weight percentages shown below using the same methods as in Example 10, six silica supported 1% by weight palladium catalysts were obtained. Upon reacting oxygen and hydrogen using these catalysts under the same reaction conditions as in Example 10, the following results were obtained:

| Ex. # | Silane | Hal. cont. (wt %) | H$_2$O$_2$ Conc. (wt %) | H$_2$ Sel. (%) |
| --- | --- | --- | --- | --- |
| 16 | BCMTMDS | Cl: 1.0 | 0.40 | 53 |
| 17 | DBETCS | Br: 0.3 | 0.92 | 91 |
| 18 | DCMDMCS | Cl: 0.2 | 0.80 | 76 |
| 19 | CPRTMS | Cl: 0.1 | 0.43 | 45 |
| 20 | CPHTMS | Cl: 0.1 | 0.30 | 40 |
| 21 | BPRTES | Br: 0.1 | 0.78 | 74 |

Comparative Examples 16-21 (Comparison with Examples 16-21)

Using a commercially available silica supported 1% by weight palladium catalyst, and treating six separate portions of it with the respective addition of 1, 1, 1, 3, 3, 3-hexamethyldisilazane (HMDS), triethylchlorosilane (TECS), triphenylchlorosilane (TPCS), tertbutyldimethylchlorosilane (t-BDMCS) (the above 4 reagents were manufactured by Tokyo Kasei Kogyo Co., Ltd.), 3, 3, 3-trifluoropropyltrimethoxysilane (TFPRTMS) and 3, 3, 4, 4, 5, 5, 6, 6, 6-nonafluorohexylmethyldichlorosilane (NFHMDCS) (the preceding two reagents were manufactured by Shin Etsu Chemical Co., Ltd.), one of the above compounds per each portion of catalyst, in place of the bromomethyldimethylchlorosilane of Example 10 in amounts necessary to produce respective silicon and fluorine weight percentages shown below using the same methods as in Example 10, six silica supported 1% by weight palladium catalysts were obtained. Upon reacting oxygen and hydrogen using these catalysts under the same reaction conditions as in Example 10, the following results were obtained:

| Comp. Ex. # | Silane name | Si or F (wt %) | $H_2O_2$ Conc. (wt %) | $H_2$ Sel. (%) |
|---|---|---|---|---|
| 16 | HMDS | Si: 2.0 | 0.07 | 10 |
| 17 | TECS | Si: 1.1 | 0.07 | 9 |
| 18 | TPHCS | Si: 0.5 | 0.02 | 3 |
| 19 | t-BDMCS | Si: 1.1 | 0.04 | 4 |
| 20 | TFPRTMS | F: 1.0 | 0.07 | 6 |
| 21 | NFHMDCS | F: 1.0 | 0.09 | 8 |

Example 22

Upon reacting oxygen and hydrogen using an alumina supported 5% by weight palladium catalyst, and which was treated with bromomethyldimethylsilane as in Example 13 and using the same reaction conditions as in Example 13 except that a 70 ppm. aqueous solution of aminotri(methylenephosphonic acid) was used as the reaction medium instead of the sulphuric acid solution, the concentration of hydrogen peroxide produced was 0.70% by weight of the reaction mixture, and the hydrogen selectivity was 78%.

EFFECTS OF THE PRESENT INVENTION

In the Examples of the present invention, the hydrogen selectivities of the hydrogen peroxide production reactions were very high compared to those of the Comparative Experiments, and where organic halogen compounds which were insoluble in water, except for those containing only fluorine, were used, a high concentration of hydrogen peroxide was obtained. In this way it is possible to produce hydrogen peroxide relatively efficiently and in high concentration even where the halogen ions of the prior art are not present through the use of the catalysts of the present invention.

What we claim is:

1. A method for producing hydrogen peroxide wherein oxygen and hydrogen are reacted in the reaction medium in the presence of a catalyst comprising a metallic or carrier supported platinum group metal catalyst onto which an organic halogen compound which is insoluble in water, which compound excludes compounds which contain no halogen other than fluorine, has been adsorbed or a platinum group metal catalyst supported on a carrier in which a halogenated organic compound which is insoluble in water, which compound excludes compounds containing no halogen other than fluorine, has been adsorbed to the carrier prior to supporting the platinum group metal.

2. A method for producing hydrogen peroxide according to claim 1, wherein an adsorbing resin is used as the catalyst carrier.

3. A method for producing hydrogen peroxide according to claim 2, wherein the adsorbing resin is a styrene-divinylbenzene copolymer.

4. A method for producing hydrogen peroxide according to claim 1, wherein the platinum group metal is palladium or platinum.

5. A method for producing hydrogen peroxide according to claim 1, wherein the organic halogen compound which is insoluble in water is a halogenated benzene, a halogenated benzene derivative or a halogenated aliphatic carboxylic acid.

6. A method for producing hydrogen peroxide according to claim 5, wherein the organic halogen compound which is insoluble in water is one or more compounds selected from the group consisting of trichlorobenzene, bromobenzene, iodobenzene, iodotoluene, bromostyrene, and 2-bromo-n-caproic acid.

7. A method for producing hydrogen peroxide according to claim 1, wherein the halogenated organic compound which is insoluble in water contains reactive functional groups and in which, the organic halogenated compound is fixed to the surface of the carrier by reaction of these groups with functional groups contained in the carrier itself.

8. A method for producing hydrogen peroxide according to claim 1, wherein the organic halogen compound which is insoluble in water is an organosilicon compound containing chlorine atoms or bromine atoms which are not directly chemically bonded to a silicon atom.

9. A method for producing hydrogen peroxide according to claim 8, wherein the organosilicon compound which is insoluble in water is one or more compounds selected from the group consisting of chloromethyldimethylchlorosilane, bis(chloromethyl)tetramethyldisilazane, dichloromethyldimethylchlorosilane, chloroethyltrichlorosilane, dichloroethyltrichlorosilane, chloropropyltrimethoxysilane, chlorophenyltrimethoxysilane, bromomethyldimethylchlorosilane, dibromoethyltrichlorosilane and bromopropyltriethoxysilane.

10. A method for producing hydrogen peroxide according to claim 1, wherein the reaction medium is water.

11. A method for producing hydrogen peroxide according to claim 1, wherein the reaction medium is an aqueous solution containing a hydrogen peroxide stabilizer.

12. A method for producing hydrogen peroxide according to claim 11, wherein the stabilizer is one or more compounds selected from the group consisting of aminotri(methylenephosphonic acid), 1-hydroxyethylidene-1,1-diphosphonic acid, ethylenediaminetetra(methylenephosphonic acid), the sodium salts of the preceding acids, phosphoric acid, sulphuric acid, nitric acid, and sodium pyrophosphate.

13. A method for producing hydrogen peroxide according to claim 1, wherein hydrogen and oxygen are reacted in the reaction medium either in the presence or absence of an inert gas, in the presence of the catalyst, at a reaction temperature of 0° C.-50° C. and at a reaction pressure of between 3 kg./cm$^2$-150 kg./cm$^2$.

* * * * *